(12) United States Patent
Maloney

(10) Patent No.: US 9,322,620 B2
(45) Date of Patent: *Apr. 26, 2016

(54) METHOD OF MAKING CAMOUFLAGE

(71) Applicant: Muddy Water Camo, LLC, Madison, MS (US)

(72) Inventor: Stephen Michael Maloney, Ridgeland, MS (US)

(73) Assignee: Muddy Water Camo, LLC, Mathiston, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,190

(22) Filed: Jan. 20, 2015

(65) Prior Publication Data

US 2015/0131901 A1    May 14, 2015

Related U.S. Application Data

(63) Continuation of application No. 14/455,918, filed on Aug. 10, 2014, now Pat. No. 8,971,661, which is a continuation of application No. 13/137,835, filed on Sep. 15, 2011.

(60) Provisional application No. 61/403,424, filed on Sep. 16, 2010.

(51) Int. Cl.
| | |
|---|---|
| *F41H 3/00* | (2006.01) |
| *F41H 3/02* | (2006.01) |
| *G06K 15/02* | (2006.01) |
| *G06T 3/40* | (2006.01) |
| *H04N 1/387* | (2006.01) |
| *H04N 1/60* | (2006.01) |

(52) U.S. Cl.
CPC .. *F41H 3/00* (2013.01); *F41H 3/02* (2013.01); *G06K 15/1878* (2013.01); *G06T 3/4038* (2013.01); *H04N 1/3876* (2013.01); *H04N 1/6072* (2013.01); *H04N 1/6083* (2013.01)

(58) Field of Classification Search
CPC .... F41H 3/00; G06K 15/1878; G06T 3/4038; H04N 1/3876; H04N 1/6072
See application file for complete search history.

(56) References Cited

U.S. PATENT DOCUMENTS

| | | | |
|---|---|---|---|
| 4,576,904 A | | 3/1986 | Anitole |
| 5,727,253 A | | 3/1998 | Wilkinson |
| 5,753,323 A | | 5/1998 | Andrus |
| 5,924,131 A | * | 7/1999 | Wilkinson .......................... 2/69 |
| 5,972,479 A | | 10/1999 | Lehman |
| 6,009,209 A | | 12/1999 | Acker et al. |
| 6,011,595 A | | 1/2000 | Henderson et al. |
| 6,128,108 A | | 10/2000 | Teo |
| 6,349,153 B1 | | 2/2002 | Teo |
| 6,496,599 B1 | | 12/2002 | Pettigrew |
| 6,682,879 B2 | | 1/2004 | Conk |
| 6,912,440 B2 | * | 6/2005 | Tooley .......................... 700/132 |
| 6,943,915 B1 | | 9/2005 | Teraue |
| 7,054,482 B2 | | 5/2006 | Mao |

(Continued)

*Primary Examiner* — Manav Seth

(74) *Attorney, Agent, or Firm* — John B. Edel; Edel Patents LLC

(57) ABSTRACT

Methods are disclosed relating to the production of camouflage that include steps such as harvesting a set of objects that have a diversity of color from the environment, placing the set of objects within a scene, capturing a set of images of the scene, adjusting color in the set of images, assembling a composite image, printing the composite image, making color adjustments and reprinting the composite image.

5 Claims, 1 Drawing Sheet

(56) References Cited

U.S. PATENT DOCUMENTS

| | | |
|---|---|---|
| 7,130,488 B2 | 10/2006 | Harrington et al. |
| 7,215,792 B2 | 5/2007 | Sharma et al. |
| 7,283,140 B2 | 10/2007 | Zhou et al. |
| 7,333,670 B2 | 2/2008 | Sandrew |
| 7,775,919 B2 | 8/2010 | Oswald et al. |
| 7,900,645 B2 | 3/2011 | Bunce et al. |
| 8,189,212 B2 | 5/2012 | Uchida et al. |
| 8,340,358 B2 | 12/2012 | Cincotti et al. |
| 8,493,391 B2 | 7/2013 | Arabolos |
| 8,971,661 B2 * | 3/2015 | Maloney .................... 382/276 |
| 2003/0130566 A1 | 7/2003 | Hawkes |
| 2005/0005339 A1 * | 1/2005 | Johnson ........................ 2/69 |

* cited by examiner

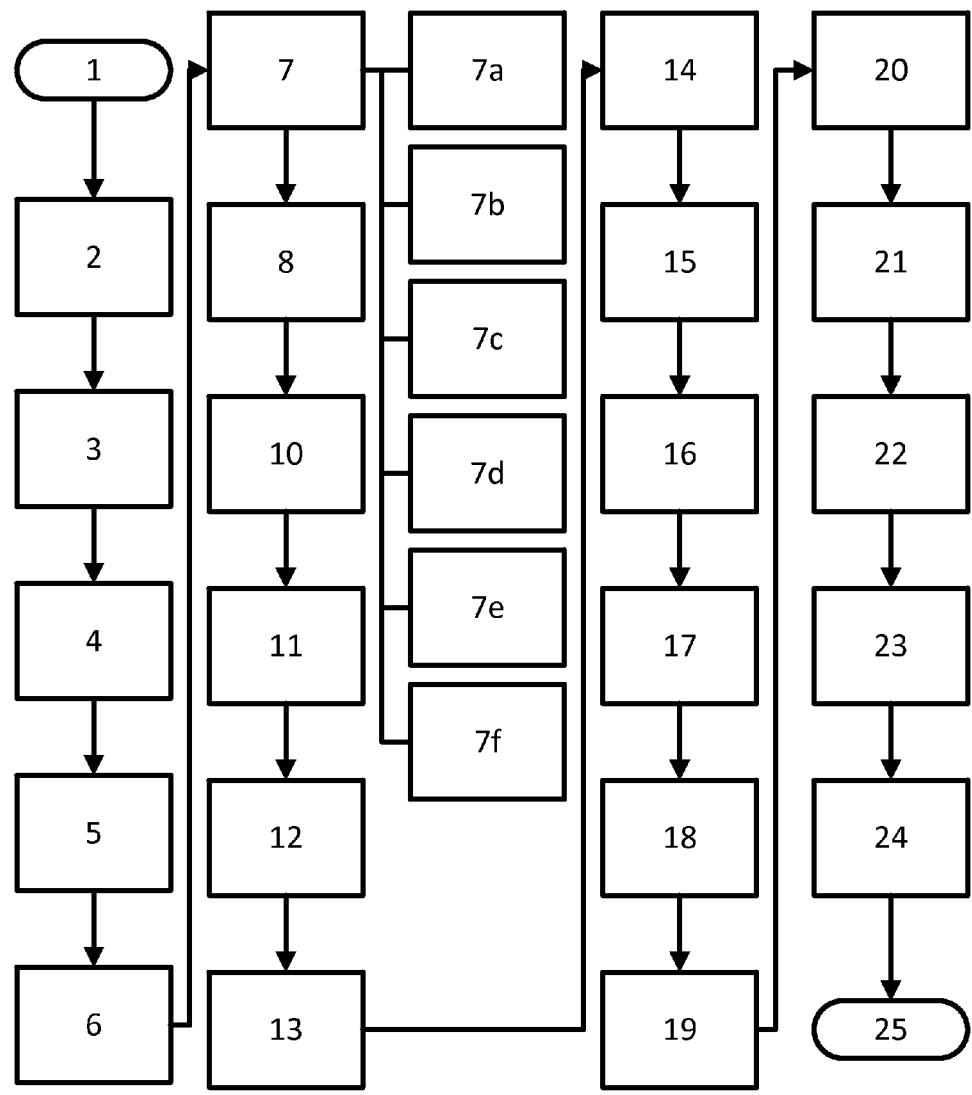

METHOD OF MAKING CAMOUFLAGE

This application is a continuation of application Ser. No. 14/455,918, filed Aug. 10, 2014, which is a continuation of U.S. application Ser. No. 13/137,835 filed Sep. 15, 2011 which claims the benefit of U.S. Provisional Application No. 61/403,424, filed Sep. 16, 2010.

Embodiments described herein may be used to make camouflage. Embodiments described herein may have particular utility in producing a pattern for camouflaging a user.

BRIEF DESCRIPTION OF THE DRAWINGS

FIG. 1 is a flow chart of a method of producing camouflage.

DETAILED DESCRIPTION

Since World War II, a variety of patterns have been designed to camouflage people and objects in an outdoor environment. Military personnel use camouflage clothing for combat and training. Other users of camouflage include hunters, bird watchers, paint ball players and other outdoor recreation enthusiasts. Camouflage prevents people from being detected by other people and animals. A good camouflage can allow hunters and other wildlife watchers to avoid startling wildlife. Camouflage aids the military in performing covert operations and hiding from enemy fire.

Early camouflage was a single color, often a shade of green or brown. More recent camouflage arrangements include repeating geometric shapes with borders. This type of camouflage typically has two or three colors, including green, brown, or black. A green version of this camouflage is designed for hiding a person in a forested environment. Another version of this camouflage is light brown with dark borders around the geometric shapes to match a dry, desert background.

Camouflage clothing manufacturers have recently attempted to create a more realistic appearance by using plant-like three-dimensional additions. However, this camouflage is noisy, cumbersome and may catch on snags.

Camouflage clothing manufacturers have recently attempted to create a more realistic appearance by gathering photographic images and placing them in a perspective relationship so as to create the appearance of depth.

Camouflage clothing manufacturers have also recently attempted to create a more realistic appearance by gathering photographic images representing various desired colors to depict a desired pattern simulating a particular environment.

Camouflage clothing manufacturers have also recently attempted to create a more realistic appearance by gathering photographic images and placing portions of those images on the corners and edges of a pattern to create a repeating pattern of camouflage.

Camouflage clothing manufacturers have also recently attempted to create a more thorough pattern of camouflage by stacking smaller objects in a synthetic perspective relationship to create depth and to create the appearance of vegetation reaching to the top of the horizon in an infinite background setting.

Camouflage clothing manufacturers have also recently attempted to create depth and achieve desired color contrast by creating a background with a conglomerate of desired colors and blends giving the appearance of depth and distance that is out of focus.

Camouflage clothing manufacturers have also recently attempted to create a diverse pattern by gathering photographic images and placing portions of those images within a pattern to create a diverse pattern useful in different environments. Camouflage clothing manufacturers have also recently attempted to create confusion in their pattern by using various color schemes and blends that attempt to avoid identification of the person wearing the camouflage pattern.

Prior art configurations fail to create a realistic waterfowl camouflage pattern because they all fail to incorporate water which is the primary part of the selected environment of waterfowl.

Prior configurations fail to create a realistic depiction of a particular environment because the images within the configuration are arranged in a synthetic relationship on a computer.

Prior art configurations fail to create realism because they fail to create an environment scene of Mother Nature. Many times the prior art only contains various objects of a selected environment without proper realistic assimilation of the elements of the environment.

The prior art is developed primarily in a computer room with various photographic images and is almost entirely synthetically created. This synthetic creation takes away from the realism of the art.

Every time a portion of the prior art is altered with a computer from its original natural state it loses its realism, particularly depth. As a result, the currently available camouflage patterns totally lack realism.

In order to achieve the goals of camouflage including but not limited to: 1) creating the realistic appearance of depth; 2) matching of the desired environment; 3) versatility of images; 4) versatility of colors; 5) concealment in the selected environment; 6) proper separation of objects in the camouflage (not too busy and not too open); 7) a pattern repeat that does not take away from the effectiveness of the pattern or the marketability of the pattern; and, 8) creating the most realistic camouflage possible, the inventor must leave the computer room and spend his/her entire time in the field. The current inventors are hunters and photographers and create their camouflage patterns almost entirely in the field, which is the best place to create the most realistic image.

One of the inventors' primary goals of the camouflage is to create realistic depth within the camouflage. Realistic depth is the most important aspect of camouflage. Depth within a surface is not associated with danger and, therefore, is the most important aspect of camouflage.

The prior art does not contain realistic depth or, alternatively, can be improved upon tremendously.

The photographic images in prior art have not been altered to depict the true color of the photographed objects because the elements and conditions contribute to the color captured by the photograph. The color must, therefore, be adjusted back to its natural state absent outside conditions affecting colors.

The color and image of water must also be adjusted and altered, both in the field and in the computer room, to achieve the desired color and image for the desired camouflage pattern.

To achieve the foregoing and other advantages, the present invention, briefly described, provides a camouflage pattern comprising naturally occurring objects within a particular photographic scene along with other naturally occurring objects that have been harvested from either that particular environment or another naturally occurring environment. Those harvested naturally occurring objects are incorporated into the particular photographic scene to accomplish a number of objectives including but not limited to: 1) adding depth to the environment; 2) matching of the desired environment; 3) versatility of images; 4) versatility of colors; 5) concealment in the selected environment; 6) proper separation of objects in the camouflage (not too busy and not too open); and 7) a pattern repeat that does not take away from the effectiveness of the pattern or the marketability of the pattern. Along with the primary objective of creating the most realistic and effective camouflage possible with presently available technology.

The most realistic and effective camouflage must be designed primarily in the field and from the viewpoint of the particular animal or bird from which camouflage is sought. To that end, all photographic images must be taken from that particular viewpoint. Additionally, to reproduce the exact color of all of the objects in the photographs, pictures must be developed and produced on a surface. Portions of the objects depicted in the photograph must be matched with the photographic images to adjust the photographic color of the objects back to their original natural color prior to being subjected to the exterior conditions. Water color must sometimes be adjusted to counteract the reflective quality of water. Additionally, to reflect the true nature of the photographic scene used as the camouflage pattern, multiple pictures must be taken from the same exact viewpoint focusing on the various layers of the scene. This must be done due to the fact that the camera lens can only focus on particular objects. Also multiple shots of the same scene can be taken with close-ups on particular objects usually in the foreground to increase the resolution of the entire photographic scene. This adjustment must be made because the camera can't focus like the human or animal eye.

In summary, to produce the most realistic camouflage possible, the inventor must leave the computer room and get into the desired environment that he/she wishes to conceal within.

The above brief description sets forth rather broadly the more important features of the present invention in order that the detailed description thereof that follows may be better understood, and in order that the present contributions to the art may be better appreciated. There are, of course, additional features of the invention that will be described in detail hereinafter.

In this respect, before explaining a number of preferred embodiments of the invention in detail, it is understood that the invention is not limited in its application to the details of the construction and to the arrangements of the components set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention.

It is an object of the present invention to provide a new and improved camouflage article and method which has all of the advantages of the prior art and none of the disadvantages.

It is another object of the present invention to provide a new and improved camouflage article and method which may be easily and efficiently manufactured and marketed.

It is a further object of the present invention to provide a new and improved camouflage article and method which is of durable and reliable construction.

An even further object of the present invention is to provide a new and improved camouflage article and method which is susceptible of a low cost of manufacture with regard to both materials and labor, and which accordingly, is then susceptible of low prices of sale to the consuming public, thereby making such camouflage article and method available to the buying public.

Still yet a further object of the present invention is to provide a new and improved camouflage article and method which provides camouflage articles having naturally occurring elements.

A further object of the present invention is to provide a new and improved camouflage article and method that has naturally occurring depth.

A further object of the present invention is to provide a new and improved camouflage article and method having naturally occurring color and versatile color.

A further object of the present invention is to provide new and improved camouflage articles which are versatile in various hunting environments.

Still yet a further object of the present invention is to provide new and improved camouflage articles depicting a naturally occurring environment taken from the viewpoint of the most hunted animal or bird.

A further object of the present invention is to provide a new and improved camouflage article and method having naturally occurring pattern repeat.

A further object of the present invention is to provide a new and improved camouflage article and method having greater definition and clarity of naturally occurring elements.

A further object of the present invention is to provide a new and improved camouflage article and method, having the most realistic depiction of naturally occurring elements as possible, utilizing the most current available technology.

Still yet a further object of the present invention is to provide a new and improved camouflage article and method that is an actual scene within the selected environment that depicts all realistic features within the environment including realistic depth.

Example 1

Referring now to FIG. 1, a flow chart of a method of producing camouflage is described in 25 steps. The steps are as follows: Step 1: Determine the target game animal or bird; Step 2 Determine the target environment; Step 3: Determine the viewpoint of the target game animal or bird; Step 4: Determine the most likely environment that the target game animal or bird will be hunted; Step 5: Observe numerous examples of the environment determined in steps 1-4 above; Step 6: Locate a specific scene within the environment determined in steps 1-4 above; Step 7: Specific scene characteristics may include 7a: Ease of repeat, 7b: Representative of environment, 7c: Versatility of color, 7d: Versatility of objects in scene, 7e: Balance, 7f: Actual depth; Step 8: Determine which of the six characteristics in 7 above are lacking in the chosen specific scene (must view specific scene through a camera lens from chosen viewpoint); Step 9: Harvest objects from the selected environment to enhance the six characteristics in 7 above to the desired levels; Step 10: Strategically place the objects harvested into the selected scene to enhance the six characteristics from 7 above; Step 11: From the selected viewpoint, photograph the specific scene including the placed harvested objects; Step 12: Review photographs of the specific scene to determine if the six characteristics from 7 above have been enhanced to the desired levels; Step 13: If photographs of the specific scene contain the desired levels of the six characteristics from 7 above, proceed to next step; if not, repeat steps 9-12; Step 14: Using computer software, repeat the specific scene from top to bottom and left to right to reach the desired repeat level; Step 15: If the desired scene does not reach the desired repeat level, repeat steps 9-12 above; Step 16: Take multiple photographs of the specific scene from the selected viewpoint, focusing on different levels of depth and different objects within the specific scene; Step 17: Using computer software, stack the multiple photographs into one scene to reach the desired level of technological information within the specific scene; Step 18: If the specific scene does not achieve the desired level of focus, repeat step 16 above; Step 19: After the specific scene is completed to the desired levels in steps 1-18, representative objects of each object within the specific scene are harvested; Step 20: The harvested objects are compared to a printed version of the specific scene and the colors in the specific scene are adjusted to match the true colors of the harvested objects; Step 21: Step 20 above must be performed in a light controlled environment to obtain the desired true color of the objects in the specific scene so as to exclude all light-related factors that affect color; Step 22: The specific scene must be printed on a substrate and introduced into the selected environment; Step 23: If the camouflage pattern produced by steps 1-22 above contains all six characteristics in 7 above and in the desired levels, it can be printed onto fabric; if not, repeat steps 6-22; Step 24: All colors in the fabric must be matched as closely as possible to the colors on the substrate; and Step 25: Introduce the camouflage fabric into the selected environment to determine that it meets all requirements for camouflage, particularly including those characteristics in 7 above; if not, repeat the steps necessary to make desired changes.

Example 2

It will be readily understood that the components of the present invention, as generally described herein, could be arranged and designed in a wide variety of different configurations. Thus, the following more detailed description of the embodiments of the system and method of the present invention is not intended to limit the scope of the invention. The scope of the invention is as broad as claimed herein. The illustrations are merely representative of certain, presently preferred embodiments of the invention. Those presently preferred embodiments of the invention will be best understood by detailed description of the methods of the description.

Those of ordinary skill in the art will, of course, appreciate that various modifications to the details of the description may easily be made without departing from the essential characteristics of the invention. Thus, the following description is intended only by way of example, and simply illustrates certain presently preferred embodiments consistent with the invention as claimed.

An example of the method of the invention is described in a step by step process in detail as follows:

Step 1: The first step in the process is to determine the primary target consumer of the camouflage pattern.

Step 2: After determining the target consumer (i.e. duck hunter deer hunter, turkey hunter, etc.) The developer will know from what viewpoint (most common view of a duck, deer, turkey, etc.) (hereinafter "selected viewpoint") all of the photographic images will be taken.

Step 3: Select the environment for the camouflage pattern (hereinafter "selected environment").

Step 4: Determine the goal of versatility of the selected environment. This process includes but is not limited to determining how broad you want the pattern to be in terms of effectiveness in particular areas.

Step 5: Gather information in the field for the selected environment. All information must be gathered with photographic images from the selected viewpoint in the selected environment.

Step 6: Based on the desired versatility of the pattern (step 4), photographic information in step 5 must be gathered from a variety of places often requiring extensive travel. The developer must carry means of taking photographic images from the selected viewpoint (i.e. tripods, ladders, tree stands, etc.).

Step 7: The information gathered in step 6 is then analyzed to determine commonality of objects and colors to determine a possible location for the base photographic scene (hereinafter "photographic scene"). The photographic scene will be the base of the camouflage pattern.

Step 8: After determining a possible location for the photographic scene, pictures of many possible scenes are taken. The inventors have spent many days in the field at many different locations to find the photographic scene. This is the most difficult and the most important part of the invention.

Step 9: The photographic scene must include but is not limited to the following: 1) versatility of color; 2) versatility of objects in the scene; 3) maximum depiction of depth; 4) not too busy nor too sparse; 5) must be amenable to a repeating pattern (see steps 16-18); 6) must have as many desired elements as possible for final pattern; 7) ease of working environment is helpful but should not be prohibitive; 8) must be able to add harvested objects to the scene to complete the scene; 9) it is helpful if the objects that are not in the photographic scene can be found and harvested in close proximity to the scene; 10) the scene must contain marketable images that are appealing to the eye; 11) the scene must be both effective for its primary purpose and marketable to consumers; 12) the scene must clearly depict realism and, therefore, cannot be unusual; 13) a primary goal is to pick a scene where many hunters will look at it and say, "that is where I hunt."

Step 10: After determining the base photographic scene, numerous photographs must be taken from the selected viewpoint. These photographs must be taken in various outdoor conditions: variable sunlight and wind and numerous combinations of these two variables.

Step 11: The scene must now be analyzed to determine: 1) whether it is in fact the desired base scene (if not you need to go back to step 4 and start over); 2) what the photographic scene needs to accomplish the ultimate goals including, but not limited to, those related in step 9.

Step 12: In order to create desired versatility of color, objects must be harvested in the field to create a pattern that achieves this objective.

Step 13: In order to create desired versatility of objects within the pattern, objects must be harvested in the field to create a pattern that achieves this objective.

Step 14: In order to create desired versatility of depth, objects must be harvested in the field to create a pattern that achieves this objective.

Step 15: The objects harvested in steps 12, 13, and 14 must now be arranged in the photographic scene and multiple pictures must be taken of the new photographic scene.

Step 16: All edges of the photographic scene must be analyzed to determine ease of repeat. The scene needs to be adjusted to comply with step 17 by adding or taking away harvested objects along the edge and corner of the photographic scene to promote the ease of repeat.

Step 17: All edges of the photographic scene must either be blank or contain objects that can be split from left to right and/or top to bottom to promote a continuous repeat.

Step 18: Patterns containing water are the easiest to create a continuous repeat because water can surround the edges and reflections can be used to repeat items from top to bottom.

Step 19: Multiple pictures of the photographic scene must now be taken at various depths from the same exact viewpoint focusing on different layers of the photographic scene to capture the entire scene at the desired focus level. The camera lens cannot focus like a human eye or animal eye. Numerous photographs must be taken and stacked to reproduce what can be seen by the human or animal eye.

Step 20: The focus of each layer of the photographic scene can be varied slightly from best to worst and front to back to accentuate depth as desired.

Step 21: Multiple photographs from the selected viewpoint must also be taken of selected items within the photographic scene foreground to add information to the final pattern scene. By taking multiple photographs within the scene one can exceed the technological limits of a single photograph by incorporating multiple photographs within the single photographic scene.

Step 22: The color of all objects in the photographic scene must now be adjusted back to "real" color.

Step 23: In order to complete step 22, you must harvest representative samples of all objects within the photographic scene.

Step 24: You must then take separate photographs of every object.

Step 25. The photographs must then be printed on a substrate.

Step 26: The harvested objects are then physically compared to the print substrate.

Step 27: Color is adjusted with the goal of matching the substrate color of the object to the actual color of the harvested object absent outside conditions. (i.e. direct light, shadows, bright light, dim light, etc.) Step 28: Step 27 is performed as many times as it takes to get the color as close as possible.

Step 29: Steps 22-28 are performed for all objects within the photographic scene.

Step 30: Due to the reflective nature of water, the color may have to be adjusted multiple times to reach the desired color. Photographs of water within the photographic scene must be taken under different conditions (sunlight, cloud cover, dark reflections, light reflections, and combinations of these conditions).

Step 31: Once the developer has a hard copy of the true color of the objects within the photographic scene, he can adjust the color on the screen to match as close as possible. (Note: The color on the screen will seldom if ever match the color of the print on any substrate, therefore, the color must be adjusted on the screen to match the substrate. This often takes many steps of trial and error.

Step 32: Step 31 must be performed for all objects in the photographic scene.

Step 33: All color adjustments must be transferred to all photographs obtained in steps 19 thru steps 21.

Step 34: Photographs from step 19 must be stacked from farthest to closest to obtain one photographic scene.

Step 35: Close-up pictures of the foreground taken in step 21 can replace the same images on the computer to increase clarity and the amount of photographic information within the photographic scene. This step has the effect of expanding the information within the camouflage file, which increases clarity and allows the image to be expanded without losing clarity.

Step 36: Step 34 also has the effect of expanding the file.

Step 37: Develop a repeating pattern both vertically and horizontally. If the edges are not conducive to the repeat you must go back to steps 16 and 18. Place the photographic scene with repeats on the left and right and top and bottom. This gives a total of five images to check the repeat.

Step 38. If water is part of the photographic scene, the water can be used to fade in and out on the edges of the repeat. Water can also be used to repeat vertically with reflections the same as a mirror.

Step 39: Objects that are on the edges can be split from top to bottom or left to right to develop a continuous repeating pattern that disguises the repeat.

Step 40: A draft of the camouflage pattern is now complete. Repeat the entire process or only the parts of the process that relate to the objects or color that are undesirable within the pattern.

Step 41: In another embodiment, all of the above steps can be performed in another weather season.

Step 42: In another embodiment, all of the above steps can be performed from another animal or bird's viewpoint as identified in step 2.

Step 43: In another embodiment, specifically for turkey hunters, two different photographic scenes can be built due to the need for different patterns on pants and shirts because the hunter is usually sitting down and the desired environment changes from forest floor to the first three horizontal feet of the forest.

Step 44: In another embodiment, specifically for large animal hunters in tree stands, all viewpoint images desired in step 2 are taken from average animal height looking up toward a tree stand. The sky is the background depending on the desired degree of the plant and tree matter covering the sky background.

While the invention has been described in connection with what are considered to be exemplary embodiments, it is to be understood that the invention is not limited to the disclosed embodiments, but on the contrary, is intended to cover various modifications and equivalent arrangements included within the spirit and scope of the amended claims.

What is claimed is:

1. A method of producing camouflage comprising:
  a. selecting an environment;
  b. selecting an exact perspective in the environment representative of a viewpoint of a hunted animal or a hunted bird;
  c. harvesting a set of objects from the environment wherein the set of objects has a diversity of color;
  d. placing the set of objects within a scene in the environment;
  e. capturing a series of images of the scene using a camera wherein the set of images comprises a first image of a first object from the set of objects and wherein the set of images comprises a second image of a second object from the set of objects;
  f. adjusting the color of the first object in the set of images to match the color of the first object absent outside conditions; and
  g. assembling the set of images into a composite image;
  h. wherein the adjusting and assembling are performed using one or more computers.

2. The method of claim 1 further comprising adjusting the color of the second object in the set of images to match the color of the second object absent outside conditions.

3. The method of claim 1 wherein the set of images is captured from the exact perspective.

4. The method of claim 1 further comprising:
   a. adjusting the color of the second object in the set of images to match the color of the second object absent outside conditions;
   b. wherein the set of images is captured from the exact perspective.

5. A method of producing camouflage comprising:
   a. selecting an environment;
   b. selecting an exact perspective in the environment representative of a viewpoint of a hunted animal or a hunted bird;
   c. harvesting a set of objects from the environment wherein the set of objects has a diversity of color;
   d. placing the set of objects within a scene in the environment;
   e. capturing a series of images of the scene using a camera wherein the set of images comprises a first image of a first object from the set of objects and wherein the set of images comprises a second image of a second object from the set of objects;
   f. adjusting the color of the first object in the set of images to match the color of the first object absent outside conditions; and
   g. assembling the set of images into a composite image;
   h. wherein the adjusting and assembling are performed using one or more computers;
   i. printing the composite image;
   j. wherein the set of images is captured from the exact perspective.

* * * * *